United States Patent
Krick et al.

(10) Patent No.: US 10,917,949 B2
(45) Date of Patent: Feb. 9, 2021

(54) LIGHT MODULE FOR A MOTOR VEHICLE COMPRISING A PLURALITY OF LIGHT SOURCE BRANCHES

(71) Applicant: VALEO VISION, Bobigny (FR)

(72) Inventors: Sebastian Krick, Bobigny (FR); Lothar Seif, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/286,685

(22) Filed: Feb. 27, 2019

(65) Prior Publication Data
US 2019/0268988 A1 Aug. 29, 2019

(30) Foreign Application Priority Data
Feb. 27, 2018 (FR) .................... 18 51733

(51) Int. Cl.
| | |
|---|---|
| *H05B 33/08* | (2020.01) |
| *H05B 45/10* | (2020.01) |
| *F21S 43/14* | (2018.01) |
| *F21S 41/153* | (2018.01) |
| *B60Q 1/26* | (2006.01) |
| *B60Q 3/16* | (2017.01) |

(Continued)

(52) U.S. Cl.
CPC .......... *H05B 45/10* (2020.01); *B60Q 1/2696* (2013.01); *B60Q 3/16* (2017.02); *F21S 41/153* (2018.01); *F21S 43/14* (2018.01); *H05B 45/46* (2020.01); *H05B 47/10* (2020.01); *F21W 2102/00* (2018.01); *F21Y 2115/10* (2016.08)

(58) Field of Classification Search
CPC ............ H05B 33/0827; H05B 33/0845; H05B 33/0815; H05B 33/089; H05B 37/02; H05B 33/0824; H05B 33/0851; H05B 33/0866; H05B 33/0842; H05B 45/10; H05B 47/10; H05B 45/46; F21S 43/14; F21S 41/153; F21S 41/141; B60Q 1/2696; B60Q 3/16; F21W 2102/00; F21W 2103/00; F21W 2107/10; F21Y 2115/10

See application file for complete search history.

(56) References Cited

U.S. PATENT DOCUMENTS 5,598,068 A * 1/1997 Shirai .................... H05B 45/46
 315/185 R
6,414,437 B1 7/2002 Diez et al.
(Continued)

FOREIGN PATENT DOCUMENTS

CN 202857100 U * 4/2013
DE 10 2011 087 658 A1 6/2013
(Continued)

*Primary Examiner* — Vibol Tan
(74) *Attorney, Agent, or Firm* — Oblon, McClelland, Maier & Neustadt, L.L.P.

(57) ABSTRACT

A light module for a motor vehicle, including a first electrical assembly on a first carrier, which harbours a plurality of branches that are connected in parallel, each branch including light sources, preferably light-emitting diodes. The module includes a second carrier which includes a control unit for controlling the supply of electrical power to the light sources, the control unit including a feedback loop from a reference branch. The light module allows the number of connections between the two carriers of the assembly to be decreased and reliability thereof to be increased.

6 Claims, 2 Drawing Sheets

(51) Int. Cl.
    *H05B 45/46*     (2020.01)
    *H05B 47/10*     (2020.01)
    *F21W 102/00*     (2018.01)
    *F21Y 115/10*     (2016.01)

(56) References Cited

U.S. PATENT DOCUMENTS

| | | | |
|---|---|---|---|
| 6,515,434 B1 * | 2/2003 | Biebl | B60Q 1/2696 |
| | | | 315/185 R |
| 7,642,535 B2 * | 1/2010 | Nakajima | H04N 1/40031 |
| | | | 250/553 |
| 8,279,209 B2 * | 10/2012 | Otaka | H04M 1/0216 |
| | | | 345/208 |
| 8,368,322 B2 * | 2/2013 | Yu | H05B 33/0827 |
| | | | 315/306 |
| 8,779,665 B2 * | 7/2014 | Oh | G09G 3/342 |
| | | | 315/151 |
| 9,041,123 B2 * | 5/2015 | Daniel | H01L 51/0529 |
| | | | 257/386 |
| 2003/0116773 A1 | 6/2003 | Kraus et al. | |
| 2009/0108773 A1 | 4/2009 | Chiang | |
| 2011/0128304 A1 | 6/2011 | Takaoka | |
| 2012/0161653 A1 | 6/2012 | Mao | |
| 2012/0319603 A1 | 12/2012 | Moller S et al. | |

FOREIGN PATENT DOCUMENTS

| | | |
|---|---|---|
| EP | 1 145 904 A2 | 10/2001 |
| FR | 3 013 554 | 5/2015 |

\* cited by examiner

LIGHT MODULE FOR A MOTOR VEHICLE COMPRISING A PLURALITY OF LIGHT SOURCE BRANCHES

The invention pertains to the field of lighting and/or light signalling, in particular for motor vehicles. More specifically, the invention relates to the field of mounting and electrically connecting light-emitting diode (LED) light sources. The invention relates to a module comprising, inter alia, a carrier for one or more light sources and a secondary carrier for a control unit for controlling the electric current supplying the light sources with power.

A light-emitting diode (LED) is an electronic component capable of emitting light when an electric current flows therethrough. The luminous intensity emitted by an LED is generally dependent on the intensity of the electric current flowing therethrough. Inter alia, an LED is characterized by an electric current intensity threshold value. This maximum forward current generally decreases with increasing temperature. Likewise, when an LED emits light, a voltage drop equal to its forward voltage is observed across its terminals. In the automotive field, LED technology is increasingly being used for numerous light signalling solutions. LEDs are used to provide light functions such as daytime running lights, signalling lights, etc. LED components resulting from one and the same production process may nevertheless exhibit different characteristics (emission capability, forward voltage, etc.). In order to group together components having similar characteristics, the LEDs that are produced arc sorted into groups, also called BINS, each BIN grouping together LEDs having similar characteristics.

It is known practice in the art to use a driver circuit for driving the electrical power supply of an assembly or group of LEDs. The circuit defines the electric current applied to a branch that is connected as a load and which comprises the group of LEDs that are connected in series. In the field of light devices for motor vehicles, it is particularly important to be able to provide constant luminosity so as to ensure the safety of users of the vehicle and of road-traffic participants. In order to provide a constant supply of power, known driver circuits use various types of converters, including DC-to-DC, linear and resistive converters, to convert the direct electric current delivered for example by a car battery into a direct load current, capable of supplying the LEDs in question with power. When a plurality of parallel branches, each comprising a group of LEDs that are connected in series, is used, it is known practice to regulate the intensity of the electric current in each branch by way of a current source per branch. However, for some applications, in particular when, for design or space reasons, a large number of LEDs, for example 80 LEDs, must be placed on a curved substrate, this solution has the drawback of requiring a plurality of interconnections between the substrate harbouring the LEDs and a driver circuit for driving their electrical power supply. Moreover, if it is desired to separate the driver circuit from the substrate harbouring the LED light sources, their multiple interconnections are at increased risk of picking up parasitic signals and electromagnetic interference, which makes the driving of the power supply for the LEDs error prone.

The aim of the invention is to overcome at least one of the problems posed by the prior art. More specifically, the objective of the invention is to propose a light module in which the number of interconnections between a control unit for controlling the supply of electrical power to a substantial number of light sources and a substrate harbouring these light sources is limited.

According to a first aspect of the invention, a light module for a motor vehicle is proposed. The module comprises a first electrical assembly which comprises a plurality of branches that are connected in parallel, each branch comprising light sources that are connected in series. At least one of the branches comprises a transistor that is connected in series with the light sources. Preferably, the light sources of one and the same branch may have similar or identical electrical and luminescent characteristics. The module also comprises a control unit for controlling the supply of electrical power to the light sources, the control unit including a feedback loop from a reference branch. The module is noteworthy in that the first electrical assembly is arranged on a first carrier, in that the control unit is arranged on a second carrier, distinct from the first carrier, and in that the feedback loop is connected to the transistors of the first electrical assembly, such that the intensity of the electric current which flows through the respective light source branches, i.e. which comprise a transistor, depends on the intensity of the electric current which flows through the reference branch.

Preferably, the reference branch may comprise electronic components, and at least some of the components may be arranged on the second carrier, the other components being arranged on the first carrier.

Preferably, all of the components of the reference branch may be arranged on the first carrier.

Alternatively, all of the components of the reference branch may be arranged on the second carrier.

The reference branch may preferably comprise at least one resistor.

Preferably, the reference branch may comprise a semiconductor element, for example a diode. Preferably, the components of the reference branch form an electrical load that is equivalent to the load of one of the branches of the first electrical assembly.

The reference branch may preferably be one of the branches of the first electrical assembly.

Preferably, the intensity of the electric current which flows through the light source branches may be substantially equal to the intensity of the electric current which flows through the reference branch, or it may have a predefined relationship therewith, the relationship being predetermined by resistance values of the reference branch and of the branches of the first electrical assembly.

Preferably, the first carrier may comprise a flexible substrate. The first carrier may preferably comprise a rigid, nonplanar, for example curved, substrate.

The light sources may preferably comprise light-emitting semiconductor element light sources. They may be light-emitting diodes (LEDs), for example.

Preferably, the transistors of the first assembly comprise NPN bipolar transistors, the output of the control unit being connected to the base of each of the transistors, such that the intensity of said output allows the intensity of the electric current which flows through the transistor, from the collector to the emitter, to be driven.

By using the measures proposed by the present invention, it becomes possible to provide a light module in which a first carrier harbours a plurality of light sources, preferably light-emitting diodc (LED) light sources, that are grouped in parallel branches. A second carrier harbours a control unit for controlling the supply of electrical power to the light sources. The control unit comprises a feedback loop and acts on the electric current flowing through a reference branch, while the multiple branches harbouring the LEDs track the driving of the reference branch. This decreases the number of connections between the second carrier and the first carrier. According to embodiments of the invention, this solution makes it possible in particular to produce a printed circuit forming the control unit independently of the characteristics of the LEDs that are present on a separate printed circuit. The latter may have a curved or flexible substrate so that the assembly of the LEDs produces a uniform luminous flux. The electronic elements that are critical to the control of the supply of electrical power to the LEDs are harboured outside the curved or flexible substrate, thereby enhancing the durability thereof and lessening complications during their maintenance. According to embodiments of the invention, the impact of electromagnetic interference on the feedback loop of the control unit may be lessened, in particular when the reference branch is located on the same printed circuit as the control unit, physically separated from the substrate harbouring the multiple light source branches.

Other features and advantages of the present invention will be better understood with the aid of the description of the examples and of the drawings, in which.

Figure 1:
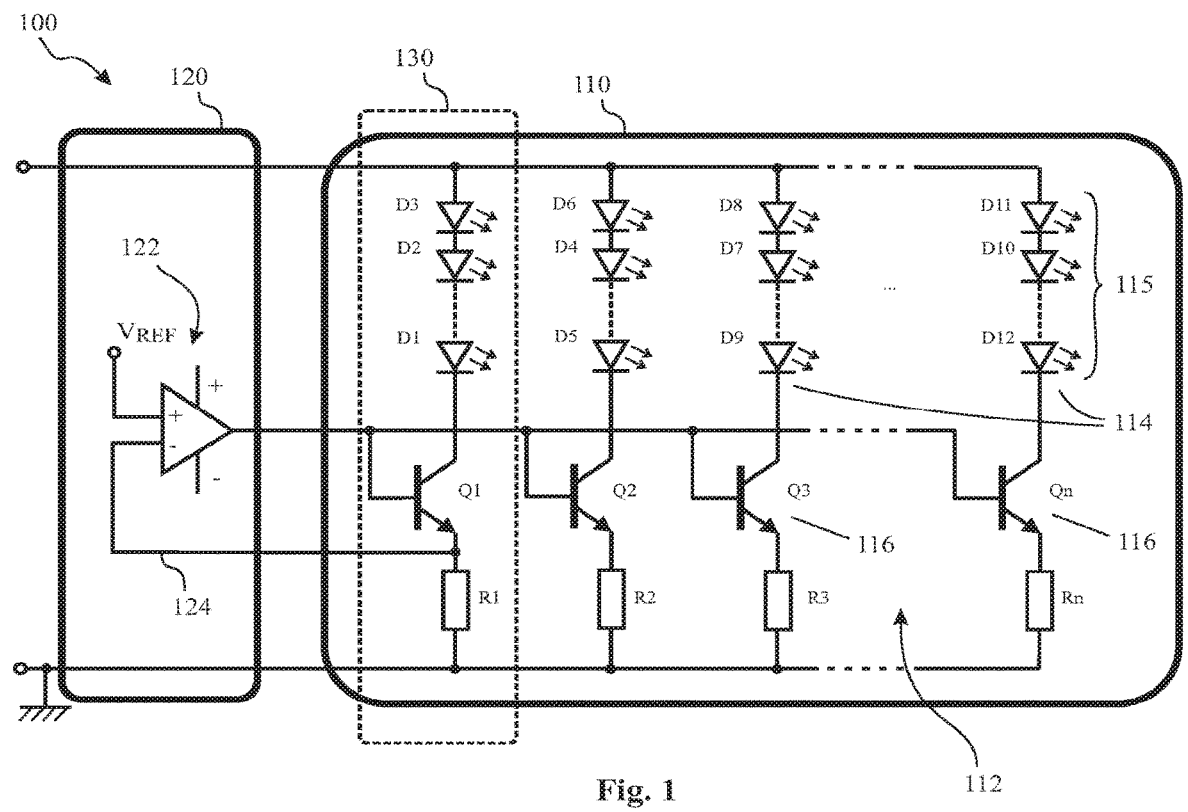
FIG. 1 shows a diagram corresponding to a preferred embodiment of a light module according to the invention.

Unless specified otherwise, technical features that are described in detail for one given embodiment may be combined with the technical features that are described in the context of other embodiments described by way of example and without limitation. Similar reference numerals will be used to describe similar concepts across various embodiments of the invention. For example, the references 100, 200 and 300 denote three embodiments of a light module according to the invention.

The illustration of FIG. 1 shows a light module 100 according to a first embodiment of the invention. A first carrier 110 is illustrated on the right. It may be for example a rigid or flexible, planar or curved, printed circuit board. A first electrical assembly 112 is produced on the carrier 110. The assembly comprises a plurality of parallel branches 114, each branch comprising a plurality of light-emitting diode (LED) light sources 115 that are connected in series. In the given example, each branch comprises three LEDs, although other numbers of LEDs are possible without, however, departing from the scope of the present invention. Preferably, the light sources of one and the same branch come from one and the same production batch and have similar semiconductor characteristics. The light sources of one and the same branch are therefore characterized by an identical BIN. The value of the resistors R1, R2, R3, etc. depends on the relative BIN values of the branches 114 of which they form part. Each of the branches 114 of the assembly 112 comprises a transistor 116, preferably an NPN bipolar junction transistor. As illustrated, the collector of the transistor 116 is connected to the cathode of an LED of the series connection, while the emitter is connected to the shunt resistor. The degree of opening of the transistor 116, driven by the difference in potential applied between its base and its emitter, allows the intensity of the electric current which flows through the LED branch 114 to be affected.

In the example of FIG. 1, one of the branches of the first assembly 112 acts as the reference branch 130 for an electric current feedback loop 124. To this end, the reference branch is connected to an input of a comparator element of a control unit 122 for controlling the supply of electrical power to the light sources. The comparator element may for example be formed by an operational amplifier. The control unit 122 is for example formed by a microcontroller element programmed for this purpose. It compares the signal obtained on the reference branch 130 with a reference voltage in order to produce a correction signal, which is connected to the bases of the transistors 116 of all of the branches 114 of the electrical assembly 112. This connection makes it possible to affect the intensity of the electric current which flows through each branch according to the intensity of the electric current which flows through the reference branch 130. Depending on the values of the respective shunt resistors R1, R2, R3, etc., the intensity of the electric current which flows through a given branch may be substantially equal to the intensity of the electric current which flows through the reference branch, or it may have a predetermined relationship therewith. It is advantageous to be able to generate electric currents of different intensities per branch in order to affect the intensity of the luminous flux emitted per branch. Specifically, when the carrier 110 is curved, it may be necessary to emit luminous fluxes of different intensities per branch, in order to guarantee the emission of a uniform overall luminous flux by all of the branches. This is made possible by adequately sizing the shunt resistors R1, R2, R3 as the intensity of the luminous flux emitted by an LED branch depends on the intensity of the electric current which flows therethrough.

It should be noted that the control unit 122 is located on a second carrier 120 shown on the left, which is physically distinct from the first carrier 130. This arrangement makes it possible to decrease the number of components on the first carrier while decreasing the number of interconnections between the two carriers.

The light module may comprise other elements such as optical elements for guiding the light beam emitted by the light sources. These elements will not be described in the context of the present invention since they do not interact functionally with the arrangements according to the invention.

Figure 2:
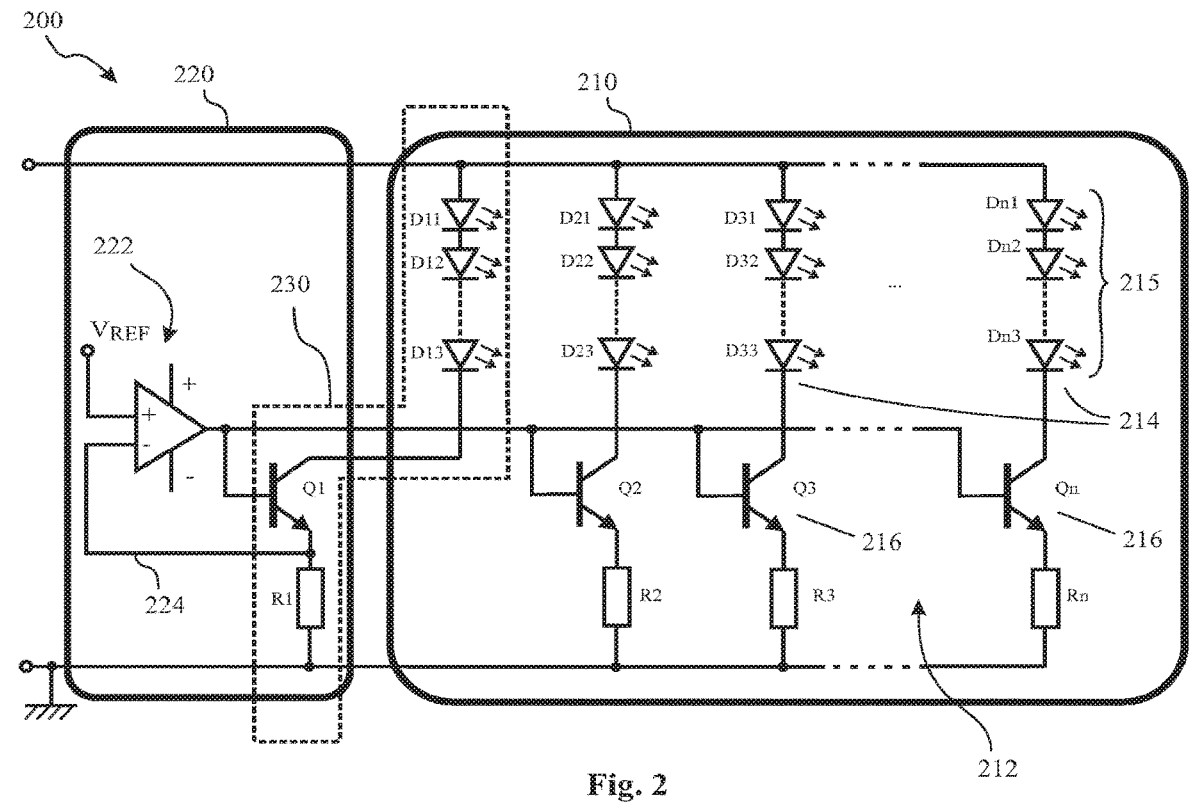
FIG. 2 shows a diagram corresponding to a preferred embodiment of a light module according to the invention.

The illustration of FIG. 2 shows a light module 200 according to a second embodiment of the invention. A first carrier 210 is illustrated on the right. A first electrical assembly 212 is produced on the carrier 210. The assembly comprises a plurality of parallel branches 214, each branch comprising a plurality of light sources 215 like in the example of FIG. 1. The value of the resistors R1, R2, R3, etc. depends on the relative BIN values of the branches 214 of which they form part. Each of the branches 214 of the assembly 212 comprises a transistor 216, preferably an NPN bipolar junction transistor. Unlike the embodiment of FIG. 1, the example of FIG. 2 has the particularity that the reference branch 230 is distributed between the first support 210 and the second support 220.

While one of the branches of the assembly 212 acts as the reference branch 230 for the electric current feedback loop 224, the transistor Q1 and the shunt resistor R1, which reflects the BIN of the light-emitting diodes D11, D12 and D13 of the reference branch, are arranged on the second carrier 230 which harbours the control unit 222. The operation of the feedback loop 224 is similar to that which has been explained for the first embodiment with reference to FIG. 1. However, in the example of FIG. 2, the acquisition of the input signal at the control unit 222, which signal comes from the reference branch 230, takes place locally on the second carrier 230. In comparison with the arrangements of the first embodiment, this further decreases the risk of electromagnetic interference being picked up over the input of the operational amplifier.

Figure 3:
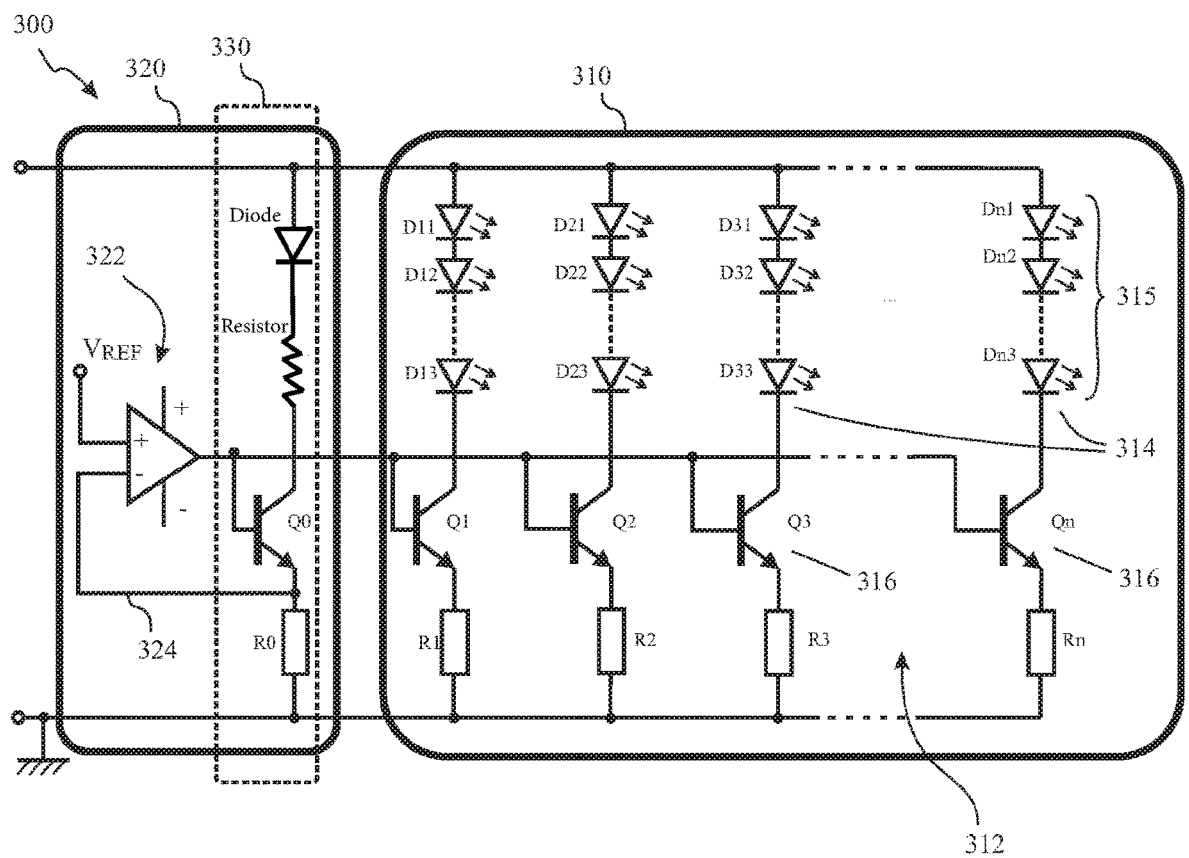
FIG. 3 shows a diagram corresponding to a preferred embodiment of a light module according to the invention.

The illustration of FIG. 3 shows a light module 300 according to a third embodiment of the invention. A first carrier 310 is illustrated on the right. A first electrical assembly 312 is arranged on the carrier 310. The assembly comprises a plurality of parallel branches 314, each branch comprising a plurality of light sources 315 like in the example of the embodiments described above. The value of the resistors R1, R2, R3, etc. depends on the relative BIN values of the branches 314 of which they form part. Each of the branches 314 of the assembly 312 comprises a transistor 316, preferably an NPN bipolar junction transistor. This embodiment of the invention has the particularity that the reference branch 330 is located entirely on the second carrier 320 shown on the left.

None of the branches of the assembly 312 acts as a reference branch for the electric current feedback loop 324. The reference branch 330 comprises a load R_LOAD, a transistor Q0 and a shunt resistor R0, which determines the nominal electric current flowing through the reference branch. All of the components of the reference branch are arranged on the second carrier 330 which harbours the control unit 322. Apart from this, the operation of the feedback loop 324 is similar to that which has been explained for the first embodiment with reference to FIG. 1: the feedback loop acts in relation to the reference branch 330 in order to control the transistors 316 of each of the branches 314 of the assembly 312 which is located on the first carrier 310. Depending on the values of the respective shunt resistors R1, R2, R3, etc., the intensity of the electric current which flows through a given branch may be substantially equal to the intensity of the electric current which flows through the reference branch, or it may have a predetermined relationship therewith. The size of the feedback loop is decreased, and the feedback takes place locally on the second printed circuit 320. The sizing of the load R_LOAD is chosen in such a way that it is equivalent to the load of the LEDs which are located on each of the branches 314 of the first assembly 312. The load R_LOAD may be formed by a resistor, or by a series connection of three diodes having semiconductor characteristics that are similar to those of the three LEDs of the branches 314 of the first assembly 312. Preferably, the load R_LOAD comprises a series connection of at least one resistor with at least one diode. In comparison with the arrangements of the first embodiment, the provision of the feedback loop on the second carrier 320 further decreases the risk of electromagnetic interference being picked up over the input of the operational amplifier. In comparison with the arrangements of the second embodiment, the provisions of the third embodiment make it possible to produce the second printed circuit 330 independently of the BIN value of the light sources 315 of one of the branches 314 of the first printed circuit 310.

Other embodiments targeting the same functionality are envisageable without, however, departing from the scope of the present invention. For example, the dummy load R_LOAD of the reference loop 330 of FIG. 3 may be formed by at least two components R_LOAD1 and R_LOAD2 connected in series. In one embodiment (not illustrated), these are a diode and a resistor. Instead of arranging the two components on the carrier 320 of FIG. 3, the first load component R_LOAD1 is arranged on the first carrier 310 while the second load component R_LOAD2 is arranged on the second carrier 320, so as to balance the distribution of the loads between the two printed circuits. Other distributions of the components of the load R_LOAD are envisageable according to the targeted applications.

The scope of protection is defined by the claims.

The invention claimed is:

1. A light module for a motor vehicle, comprising:
a first electrical assembly which comprises a plurality of branches that are connected in parallel, each branch comprising light sources that are connected in series, at least one of the branches comprising a transistor that is connected in series with the light sources;
a controller for controlling the supply of electrical power to the light sources, the controller including a feedback loop from a reference branch; wherein
the first electrical assembly is arranged on a first carrier, the controller is arranged on a second carrier, distinct from the first carrier, and the feedback loop is connected to the transistors of the first electrical assembly, such that the intensity of the electric current which flows through the respective light source branches depends on the intensity of the electric current which flows through the reference branch,
the reference branch comprises a transistor connected in series with a load and a shunt resistor, the reference branch is arranged on the second carrier, and no light sources are arranged on the reference branch, wherein
the controller comprises a comparator element whose input is connected to the emitter of the transistor of the reference branch,
the output of the feedback loop is connected to the bases of the transistors of the plurality of branches of the first electrical assembly, and
the load comprises a series connection of at least one resistor with a at least one diode separate from any transistor of the light module.

2. The light module according to claim 1, wherein the reference branch comprises at least one resistor.

3. The light module according to claim 2, wherein the reference branch comprises a semiconductor element.

4. The light module according to claim 1, wherein the intensity of the electric current which flows through the light source branches is substantially equal to the intensity of the electric current which flows through the reference branch, or has a predefined relationship therewith, the relationship being predetermined by resistance values of the reference branch and of the branches of the first electrical assembly.

5. The light module according to claim 1, wherein the first carrier comprises a flexible substrate.

6. The light module according to claim 1, wherein the light sources comprise light-emitting semiconductor element light sources.

* * * * *